Figure 1:
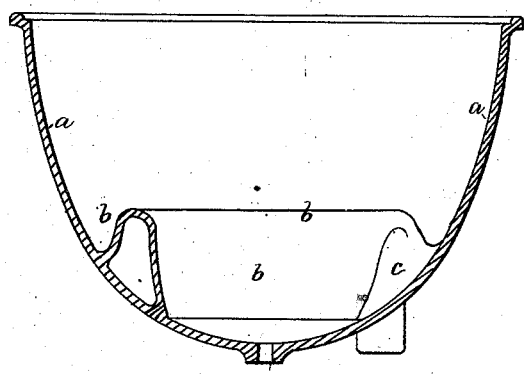

G. W. WALKER.
Kettle for Heating or Cooking by Steam.

No. 160,857.  Patented March 16, 1875.

Witnesses.
E. H. Sears.
R. L. Roberts.

Inventor.
Geo. W. Walker.
PER Crosby & Gregory Att'ys.

THE GRAPHIC CO.PHOTO-LITH.39 & 41 PARK PLACE, N.Y.

UNITED STATES PATENT OFFICE.

GEORGE W. WALKER, OF MALDEN, MASSACHUSETTS.

IMPROVEMENT IN KETTLES FOR HEATING OR COOKING BY STEAM.

Specification forming part of Letters Patent No. 160,857, dated March 16, 1875; application filed February 24, 1875.

*To all whom it may concern:*

Be it known that I, GEORGE W. WALKER, of Malden, in the county Middlesex and State of Massachusetts, have invented an Improved Kettle for Heating or Cooking by Steam, of which the following is a specification:

My invention consists of a kettle of peculiar construction, such as is herein shown and described, having special adaptation for economical and efficient utilization of the caloric conveyed by steam, for the purpose of heating, even to the boiling-point, any contents placed in the kettle, with but little waste radiation of heat from the steam, said construction being also such as admits of the drawing off from the bottom of the kettle the last drop of fluid-matter therein, and such also as exposes the interior of the kettle most fully and easily to cleansing and scouring operations, no part thereof being difficult of access.

Figure 2:
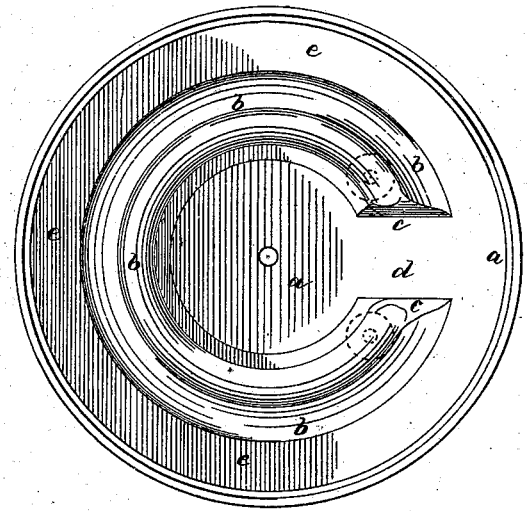
Figure 3:
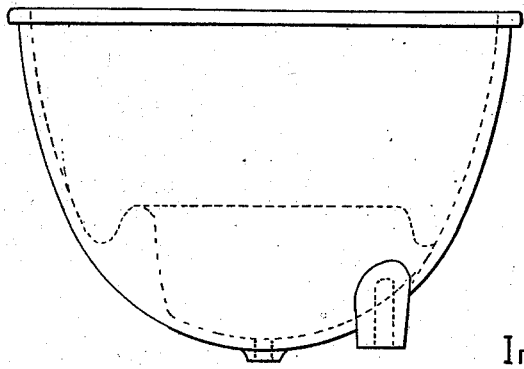

The drawing shows a kettle embodying my invention, Figure 1 being a sectional elevation, Fig. 2 a plan, and Fig. 3 a side elevation, of said kettle, which I propose to make by casting, though it is possible to make it of sheet metal.

The exterior of the kettle will usually be made in the general hemispherical form shown, of sufficient thickness for strength, and to admit of the flow of metal in casting. Within the kettle is made the peculiar feature of my invention, viz, a steam-passage, which may be described as a tube, of irregular form of section, bent into circular form, with closed ends nearly approaching each other, the shell of the kettle forming a small part of the tube-shell, which part alone radiates heat which does not operate upon the contents of the kettle, the balance, and by far the greater part of the tube-shell, being radiating surface, which is effective in heating the contents of the kettle. At one end of this curved tubular formation steam is entered, which fills, and passes through and around the tube to the other end, when it or the water of condensation escapes. This tubular formation may be further described as projecting upward and inward from the shell of the kettle about midway from the lowest point in the kettle to the line around the shell of the average fluid level. The kettle has a draw-off hole at its lowest part, which is to be provided with a valve or other means for opening and closing the passage.

$a$ is the shell of the kettle; $b$, the upward and inward projecting effective heating part of the tubular steam-passage, the ends $c\ c$ of which approach each other, leaving a passage, $d$, between said ends, the lower surface of said passage being coincident with the inner surface of the shell of the kettle, and the side surfaces being the ends $c\ c$ of the tubular steam-passage. The elevated annular space marked $e$ drains into the passage $d$.

This construction has many practical advantages over kettles with steam-jacketed bottoms, or with steam-jacketed sides, or with sides and bottoms both steam-jacketed; also over kettles with a central steam-heated bulb, and also over those containing coils of independent or separate steam-heated pipes.

I claim—

The boiler $a$, combined with the segmental steam-chamber $b$, constructed and arranged substantially as and for the purpose specified.

In testimony whereof I have signed my name to this specification in the presence of two subscribing witnesses.

GEO. W. WALKER.

Witnesses:
J. B. CROSBY,
S. B. KIDDER.